United States Patent [19]
de Sa e Silva

[11] 3,835,390
[45] Sept. 10, 1974

[54] POWER OUTPUT STAGE FOR USE IN LOW-POWER RADIO FREQUENCY TRANSMITTERS

[75] Inventor: Claudio de Sa e Silva, Bozeman, Mont.

[73] Assignee: Info Systems, Inc., Bozeman, Mich.

[22] Filed: Dec. 22, 1971

[21] Appl. No.: 210,651

[52] U.S. Cl. .................. 325/105, 330/15, 332/31 T
[51] Int. Cl. .............................................. H04b 1/04
[58] Field of Search ........ 325/105, 182; 330/15, 17, 330/18, 20, 30, 31, 207 A; 332/31 T, 43 R, 43 T, 60, 48

[56] References Cited

UNITED STATES PATENTS

| | | | |
|---|---|---|---|
| 3,202,939 | 8/1965 | Reiling | 325/105 |
| 3,229,230 | 1/1966 | Feldman | 332/31 T |
| 3,413,570 | 11/1968 | Bruene et al. | 325/182 |
| 3,484,723 | 12/1969 | Rypkema | 332/43 B |
| 3,486,124 | 12/1969 | Eisenberg | 330/207 A |
| 3,562,673 | 2/1971 | Caspari | 332/31 T |
| 3,624,506 | 11/1971 | Townsend | 332/31 T X |

*Primary Examiner*—Benedict V. Safourek
*Attorney, Agent, or Firm*—Merchant, Gould, Smith & Edell

[57] ABSTRACT

A power output stage for use in a low-power radio frequency transmitter. The output stage includes a first complementary pair of transistors which are driven at the carrier signal frequency and at a sufficiently high power level to provide operation of the transistors in the switching mode. An emitter-follower amplification stage is connected to the first transistor pair and provides an additional power increase. A filter network connected to the output transistor pair attenuates the harmonic frequencies while allowing the fundamental carrier signal frequency to pass to the broadcast antenna.

3 Claims, 3 Drawing Figures

INVENTOR
Claudio de Sa e Silva
BY
MERCHANT & GOULD
ATTORNEYS

POWER OUTPUT STAGE FOR USE IN LOW-POWER RADIO FREQUENCY TRANSMITTERS

BACKGROUND OF THE INVENTION

1. Field of the Invention

The present invention pertains to a power output stage for use in radio frequency transmitters.

2. Description of the Prior Art

In numerous instances, it is highly desirable to operate radio-control transmitters without a station license. However, in order for such operation to be legally permissable, the transmitter must comply with certain operational requirements set forth in Part 15 of the Federal Communications Commission Rules and Regulations (FCC R&R). Transmitters meeting these requirements are known as "Low-power Communication Devices" and may be operated on any frequency in the bands 10–490 kc/s, 510–1,600 kc/s (AM broadcast band) and 26.97–27.27 mc/s (Citizens band), as well as any frequency above 70 mc/s.

More specifically, Part 15 of the FCC R&R provides that low-power communication devices which operate within the AM broadcast band (i.e., 510–1,600 kc/s) must either (1) limit the transmitted radiation so that the field strength does not exceed a certain value or, alternatively, (2) limit the power input to the final radio stage (exclusive of filament or heater power) so as not to exceed 100 milliwatts. In those instances in which the transmitter is operating under the second of these requirements (i.e., with a restricted power input to the final radio stage), it is highly desirable that the final power output stage have as high an efficiency as possible (i.e., a high ratio of output power to total dc input power). Thus, the power output stages of the commercially available low power transmitters make extensive use of conventional Class C amplifiers because such amplifiers presently provide the highest efficiency. Using transistorized Class C amplifiers and striking a compromise between high efficiency and high power, practical efficiencies of 60 to 80 percent are obtained. At present, such efficiencies are the highest obtainable for an RF power output stage.

SUMMARY OF THE INVENTION

The present invention provides a power output stage for radio frequency transmitters which has a practical efficiency in excess of 90 percent. Such efficiency is considerably higher than that heretofore available utilizing conventional Class C amplifiers. As a result of this increased efficiency, it has been experimentally determined that the field strength of the emitted radiation is signficantly higher than that obtained by conventional transmitters over considerable distances from the transmitting antenna. Thus, a marked improvement in reception of the transmitted signal is obtained.

To provide this significant improvement, the present invention utilizes complementary PNP and NPN transistors operating in the switching mode. The operation of the transistors in the switching mode provides an essentially square-wave output which can be amplitude modulated, phase modulated, frequency modulated, etc. A filter network is provided for attenuating the harmonic frequencies of the carrier signal while allowing the fundamental frequency and sideband frequencies to pass to the antenna system. In the preferred embodiment, a second complementary pair of emitter-follower transistors is utilized to provide further power amplification of the square-wave output from the first transistor pair.

As will be readily appreciated from a reading of the Detailed Description which follows, the present invention provides an RF output stage which is simply designed, yet highly efficient, dependable and inexpensive to construct. Other advantages of the present invention will be equally apparent.

BRIEF DESCRIPTION OF THE DRAWINGS

Referring now to the drawings wherein like numerals represent like elements of the invention throughout the several views.

DETAILED DESCRIPTION OF THE PREFERRED EMBODIMENTS

Figure 1:
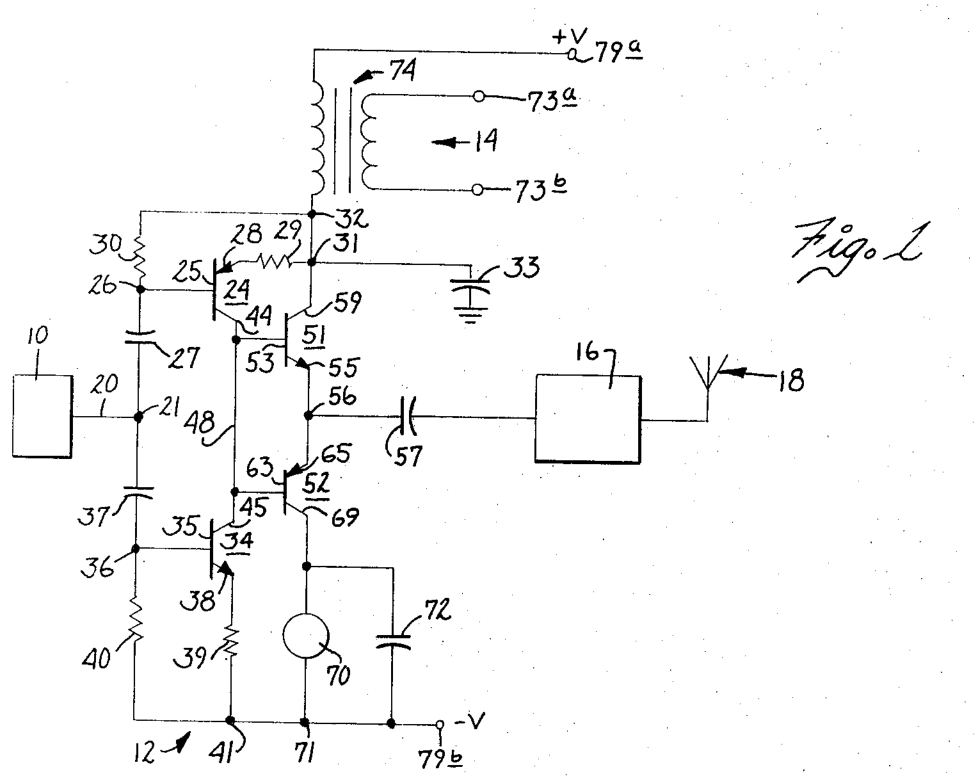
FIG. 1 is a schematic view of a preferred low-power RF output stage as provided by the present invention.

With particular reference to FIG. 1, a low-power, radio frequency (RF) transmitter is illustrated. As shown, the transmitter comprises an oscillator means 10, an amplification means or output stage 12, an amplitude modulation means 14, a filter means 16, and an antenna means 18. Although the preferred embodiment of the output stage 12 is described in conjunction with amplitude modulation techniques, it should be understood that other modulation schemes (e.g., phase modulation, frequency modulation, etc.) can also be utilized. In addition, oscillator 10 is a conventional oscillator for providing a continuous wave, RF signal and need not be further described.

The output stage 12 is connected to oscillator 10 through a lead 20 which is connected to an input terminal or junction point 21 of stage 12. A PNP transistor 24 has its base 25 connected to junction point 21 through a junction point 26 and a coupling capacitor 27. The emitter 28 of transistor 24 is connected to junction point 26 through a pair of resistors 29 and 30 and a pair of junction points 31 and 32. Resistors 29 and 30 serves as the base return resistance for the transistor 24. A grounded capacitor 33 is connected to junction point 31 and functions as a RF bypass capacitor. Similarly, an NPN transistor 34, complementary to the PNP transistor 24, has its base 35 connected to junction point 21 through a junction point 36 and a coupling capacitor 37. The emitter 38 of transistor 34 is connected to junction point 36 through a pair of resistors 39 and 40 and a junction point 41. Resistors 39 and 40 serve as the base return resistance for transistor 34. As shown, the collectors 44 and 45 of transistors 24 and 34, respectively, are connected to each other by a lead 48.

A complementary, emitter-follower pair of transistors 51 and 52 are driven by the transistors 24 and 34. As shown, the transistors 51 is a NPN transistor having its base 53 connected to the lead 48 joining collectors 44 and 45 of transistors 24 and 34, respectively. The emitter 55 of transistor 51 is connected through an output terminal or junction point 56 and a coupling capacitor 57 to the filter circuit 16. The collector 59 of transistor 51 is connected to the emitter 28 of transistor 24 through the junction point 31 and the resistor 29. Similarly, the PNP transistor 52 has its base 63 connected to lead 48 and the collectors 44 and 45 of transistors 24 and 34, respectively. The emitter 65 of transistor 52 is connected to the junction point 56 and therethrough to the capacitor 57 and filter circuit 16. Finally, the collector 69 of transistor 52 is connected to the emitter 38 of transistor 34 through meter apparatus 70, a junction point 71 and the resistor 39. A capacitor 72 shunts meter apparatus 70. The junction points 41 and 71 are connected to a negative output terminal **79*b* of a d.c. voltage power supply (not shown). The power supply also has a ppositive output terminal 79*a*.**

The amplitude modulation means 14 includes an audio signal source (not shown) which is connected to the input terminals **73*a* and 73*b* of the primary of a transformer 74. The secondary of transformer 74 connects the positive terminal 79*a* of the d.c. power supply to junction point 32 of output stage 12.**

Figure 2:
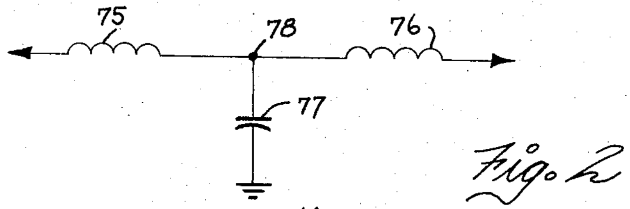
FIG. 2 is a schematic view of an LC filter network utilized in the present invention.

As can be seen in FIG. 2, the filter system 16 includes a pair of coils 75 and 76 and a capacitor 77 connected to a junction point 78 between the coils to provide a conventional capacitance-inductance (LC) filter circuit. Preferably, the impedance of filter system 16 is sufficient to allow the fundamental component of an RF carrier signal to pass unimpeded to the antenna system 18 while attenuating all the harmonic components of the fundamental signal frequency. In addition, filter system 16 should provide at the fundamental signal frequency an impedance match between the output stage 12 and the antenna system 18 connected to filter 16.

Typical examples of component values for output stage 12 apply a 12-volt direct current power source to terminals **79*a* and 79*b*** are listed below.

| COMPONENT | | VALUE |
|---|---|---|
| Resistor | 29 | 39 ohms |
| | 30 | 100 |
| | 39 | 39 |
| | 40 | 100 |
| Capacitor | 27 | 0.01 microfarads |
| | 33 | 0.1 |
| | 37 | 0.01 |
| | 57 | 0.05 |
| | 72 | 0.1 |
| Transistor | 24 | 2N368 |
| | 34 | 2N3569 |
| | 51 | TIP-31A |
| | 52 | TIP-32A |

The operation of the above circuitry can be described as follows. The oscillator 10 generates a continuous wave RF signal at the desired RF signal frequency. This carrier signal is applied to transistors 24 and 34 through coupling capacitors 27 and 37, respectively, and is of sufficient amplitude to drive the transistors in the switching mode of operation (i.e., transistors 24 and 34 are driven alternately from a state of full conduction to a state of nonconduction so as to provide an essentially square wave output). Thus, during the positive half cycle of the RF signal, base 35 of NPN transistor 34 is positive causing transistor 34 to conduct and switching off PNP transistor 24. During this period, lead 48 connecting collectors 44 and 45 is at a potential of −V. Then, during the negative half cycle of the RF signal, the transistor 24 is switched to a conducting state and the transistor 34 is switched to a nonconducting state resulting in lead 48 having a potential of +V. The resultant square wave pattern appearing along lead 48 has the same period as the RF signal generated by oscillator 10.

The square wave pattern along lead 48 appears at the bases 53 and 63 of the emitter-follower transistors 51 and 52, respectively. The current amplification transistors 51 and 52 function in a manner similar to a double-pole-single-throw switch causing the square wave form present at lead 48 to also appear at junction point 56 (except for a small reduction in amplitude due to the base-to-emitter diode drops of transistors 51 and 52). The square wave signal appearing at junction point 56, hereafter called the RF carrier signal, is then applied to the filter network 16 through the capacitor 57 which prevents the passage of any dc to the filter 16. As pointed out previously, the filter system 16 attenuates the harmonic frequencies of the carrier signal while allowing the fundamental frequency to pass therethrough.

Amplitude modulation of the carrier signal is accomplished by applying a control signal (e.g., an audio frequency signal) to the input terminals **73*a* and 73*b* connected to the primary of transformer 74. This audio signal is then induced in the secondary of transformer 74 and modulates the voltage at junction point 32 about the +V voltage. The audio signal voltage at junction point 32 causes the amplitude of the square wave at junction points 48 and 56** to vary at the same audio rate. Since the fundamental signal delivered to the antenna system varies with the square wave amplitude, AM transmission results.

When desired, the total input power utilized by output stage 12 can be determined by a reading of milliammeter (or ammeter) 70 which measures the total current drain from the dc power supply through the output transistors 51 and 52. The product of this current and the total supply voltage applied to transistors 51 and 52 is the total input power used by amplification stage 12. As noted previously, for a transmitter to qualify as a "Low-power Communication Device," this input power cannot exceed 100 milliwatts. In the preferred embodiment, the values of the inductors 75 and 76 and of the capacitor 77 are selected to provide, in combination with the voltage magnitudes applied to the supply terminals **79*a* and 79*b*,** the desired 100 milliwatt power level.

From this description, it can be readily appreciated that transistors 34 and 52 function as first semiconductor amplifying means operating in the switching mode for amplifying the positive half cycle of the RF signal. Similarly, transistors 24 and 51 function as second semiconductor amplifying means operating in the switching mode for amplifying the negative half cycle of the carrier signal. The amplified positive and negative half cycles are then combined at junction point 56 to provide an essentially square wave output having the control signal superimposed thereon.

Figure 3:
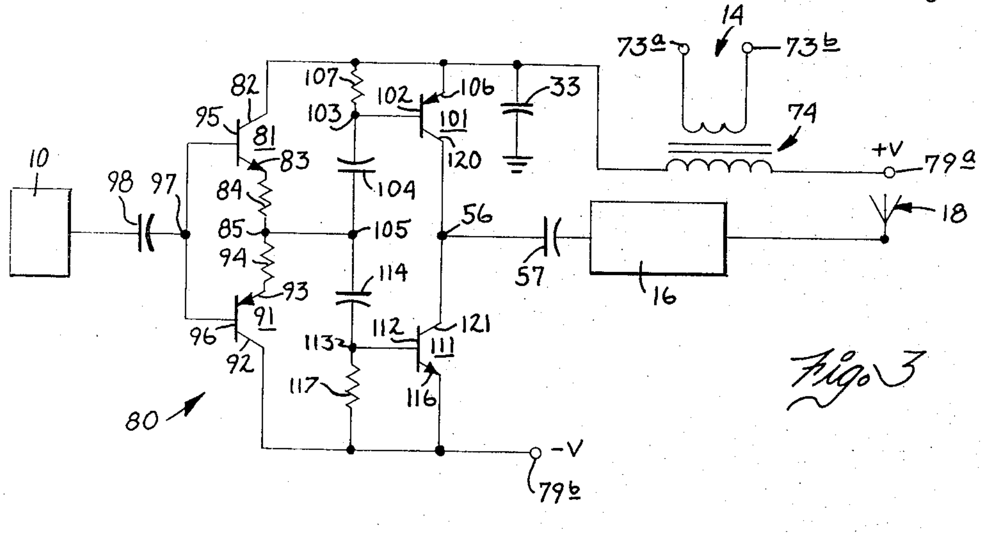
FIG. 3 is a schematic view of an alternative low-power RF output stage as provided by the present invention.

The alternate amplification stage, generally designated 80 in FIG. 3, utilizes the same basic operational principles as output stage 12. Here, however, the emitter-follower transistors 51 and 52 of output stage 12 have been eliminated. Instead, an NPN transistor 81 has its collector 82 connected to the positive side of the dc voltage supply (+V) and its emitter 83 connected through a resistor 84 to a junction point 85. Similarly, the PNP transistor 91 has its collector 92 connected to the negative side of the dc voltage supply (—V) and its emitter 93 connected through a resistor 94 to the junction point 85. The bases 95 and 96 of transistors 81 and 91, respectively, are each connected to a junction point 97 which is, in turn, connected through a coupling capacitor 98 to oscillator 10. A PNP transistor 101 has its base 102 connected to junction point 85 through a junction point 103, a capacitor 104 and another junction point 105. The emitter 106 of transistor 101 is connected to the positive side of the dc voltage supply. A resistor 107 connected to junction point 103 and the DC voltage supply provides base return resistance for transistor 101. Similarly, an NPN transistor 111 has its base 112 connected to junction point 105 through a junction point 113 and a capacitor 114. The emitter 116 of transistor 111 is connected to the negative side of the dc supply voltage and a resistor 117 provides base return resistance. Finally, the collectors 120 and 121 of transistors 101 and 111, respectively, are tied together at junction point 56 for transmission of the output signal to the band pass filter network 16.

In this alternative embodiment, the RF signal provided by RF oscillator 10 is again sufficient to drive the output transistors in the switching mode of operation. During the positive half cycle of the RF signal, transistor 81 and 111 are switched to the conducting state. This provides a negative square wave potential at junction point 56. During the negative half cycle of the RF signal, the transistors 91 and 111 conduct to provide a positive potential at the junction point 56. Thus, a square wave carrier signal output is obtained at junction point 56 having a 180° phase reversal from the RF signal. Amplitude modulation of this square wave carrier signal via amplitude modulation means 14 is obtained as described above.

Since my invention has been described solely in conjunction with two preferred embodiments thereof, numerous modifications thereto will be readily apparent to the artisan. This being the case, it is my intent to be limited solely by the spirit and scope of the appended claims.

What is claimed is:

1. A radio frequency communication device comprising:

a. oscillator means for generating a continuous wave, radio frequency signal;

b. switching amplification means adapted to receive power from a dc power source, and operatively connected to receive said radio frequency signal for producing a single amplified and substantially square wave carrier signal in response thereto, said switching amplification means including complementary transistor circuits having first transistor switching means driven into saturation during a first half cycle of said radio frequency signal and second transistor switching means driven into saturation during a second half cycle of said radio frequency signal, said first transistor switching means including a first transistor connected to said oscillator means and having a second transistor connected thereto as an emitter-follower, and said second transistor switching means including a first transistor connected to said oscillator means and a second transistor connected to said first transistor of said second transistor switching means as an emitter-follower;

c. modulation means operatively connected to said switching amplification means for modulating said carrier signal with a control signal; and d. means operatively connected to said switching amplification means for transmitting said modulated carrier signal.

2. A radio frequency communication device comprising:

a. oscillator means for generating a continuous wave, radio frequency signal;

b. switching amplification means adapted to receive power from a dc power source, and operatively connected to receive said radio frequency signal for producing a single amplified and substantially square wave carrier signal in response thereto, said switching amplification means including complementary transistor circuits having first transistor switching means driven into saturation during a first half cycle of said radio frequency signal and second transistor switching means driven into saturation during a second half cycle of said radio frequency signal;

c. modulation means operatively connected to said switching amplification means for modulating said carrier signal with a control signal; and d. means operatively connected to said switching amplification means for transmitting said modulated carrier signal, comprising:

i. an antenna for transmitting said modulated carrier signal, and ii. an LC filter network connected between said switching amplification means and said antenna for passing the fundamental frequency of said modulated carrier signal to said antenna and for attenuating the harmonic frequencies thereof.

3. The radio frequency communication device of claim 2, wherein said first and second transistor switching means of said switching amplification means include output transistor means operatively connected to provide said modulated carrier signal to said LC filter network, and wherein said filter network is electrically tunable to cause said antenna to appear as a resistive load to said switching amplifier means, said filter network having electrical components whose relative valves may be selected for limiting power drain by said output transistor means to 100 milliwatts.

* * * * *